United States Patent
Ai et al.

(10) Patent No.: US 7,174,269 B2
(45) Date of Patent: Feb. 6, 2007

(54) SPEED SENSING METHOD AND APPARATUS

(75) Inventors: Xiaolan Ai, Massillon, OH (US); Orestes J. Varonis, North Canton, OH (US); Wen-Ruey Hwang, North Canton, OH (US)

(73) Assignee: The Timken Company, Canton, OH (US)

( * ) Notice: Subject to any disclaimer, the term of this patent is extended or adjusted under 35 U.S.C. 154(b) by 0 days.

(21) Appl. No.: 10/531,098

(22) PCT Filed: Oct. 6, 2003

(86) PCT No.: PCT/US03/31601

§ 371 (c)(1),
(2), (4) Date: Apr. 7, 2005

(87) PCT Pub. No.: WO2004/034065

PCT Pub. Date: Apr. 22, 2004

(65) Prior Publication Data

US 2006/0015288 A1    Jan. 19, 2006

Related U.S. Application Data

(60) Provisional application No. 60/417,839, filed on Oct. 11, 2002.

(51) Int. Cl.
*G01P 5/00* (2006.01)
*G01P 7/00* (2006.01)

(52) U.S. Cl. .................................... 702/142

(58) Field of Classification Search ............. 702/142
See application file for complete search history.

(56) References Cited

U.S. PATENT DOCUMENTS

| 5,652,509 A | 7/1997 | Weis |
| 5,825,177 A | 10/1998 | Finnestad |
| 2001/0046042 A1* | 11/2001 | Theile et al. ............... 356/28 |
| 2003/0052684 A1* | 3/2003 | Nelson et al. .............. 324/329 |

FOREIGN PATENT DOCUMENTS

| DE | 4014756 | 11/1991 |
| JP | 6034647 | 2/1994 |
| WO | 8505187 | 11/1985 |

* cited by examiner

*Primary Examiner*—John Barlow
*Assistant Examiner*—Cindy D. Khuu
(74) *Attorney, Agent, or Firm*—Polster, Lieder, Woodruff & Lucchesi, L. C.

(57) ABSTRACT

A method and apparatus for measuring the speed of a target object passing a pair of sensor units (12) displaced apart by a predetermined distant L in the direction of motion of the target object (16). Passage of one or more features of the target object (16) past the first sensor unit (12A) results in the generation of a signal ($x_1$), and passage of the same feature of the target object (16) past the second sensor unit (12B) results in the generate of a second signal, ($x_2$). A signal processor (18) is configured to determine a mathematical correlation between signals ($x_1$) and ($x_2$), and an associated time delay ($\tau_0$). The speed (v) of the target object (16) is calculated by the signal processor (18) as the ratio of the predetermined distance (L) to the time delay ($\tau_0$).

8 Claims, 3 Drawing Sheets

SPEED SENSING METHOD AND APPARATUS

CROSS-REFERENCE TO RELATED APPLICATIONS

The present application is related to, and claims priority from PCT International Application Number PCT/US2003/031601 filed on Oct. 6, 2003, which in turn is related to, and claims priority from U.S. Provisional Patent Application No. 60/417,839 filed on Oct. 11, 2002, each of which is herein incorporated by reference.

TECHNICAL FIELD

The present invention relates generally to speed sensors configured to monitor the speed of a moving body such as a shaft or axle, and in particular, to an improved speed sensing system utilizing a pair of sensors each configured to detect random targets on a moving body, and a signal processor configured to measuring a phase shift between each target detection signals, the phase shift proportional to a speed of the target.

BACKGROUND ART

Speed sensing plays an important role in monitoring, and thus controlling, machine operations. An accurate and reliable speed sensor is critical. Over the years numerous speed-sensing techniques and devices have been developed. Mechanical speedometers, electro-mechanical speed sensors, magnetic speed sensors, and optical speed sensors are just a few examples. Most popular speed sensing systems often include a single sensor, an electronic control unit, and a target whose speed relative to the single sensor is measured.

Depending upon the type of speed being measured, i.e., linear or angular speed, and on the sensor technology that is employed, a target may be constructed in a variety of ways and may take many different forms. Conventionally, speed sensing targets have been made from marked bars and toothed wheels, from multi-polar magnetic-strips and magnetic-rings, and from linear and angular bar-encoders. As the target moves relative to the sensor, a conventional sensor output signal takes the form of a series of pulses, with the pulse frequency being proportional to the target wheel speed.

The resolution or accuracy of these conventional speed sensing systems depend heavily, among other factors, on the accuracy of the spacing between the teeth in a toothed target, the spacing of the magnetic poles in a magnetic target, and the spacing of the bars in a bar encoder. Thus, for a precision system, a target with high spacing accuracy is preferred.

However, the target manufacturing cost is proportional to the target spacing accuracy requirements, and it is not always economical to construct a large outer diameter angular target wheel or a long linear target with high spacing accuracy. Accordingly, it would be advantageous to introduce a speed sensing system which maintains a high degree of speed measurement accuracy without requiring the production and application of a precision speed sensing target.

SUMMARY OF THE INVENTION

Briefly stated, the present invention sets forth a speed sensor system comprising a pair of sensing elements disposed in a directionally spaced relationship adjacent a surface of a moving object from which a speed measurement will be acquired. A target, having substantially random features is disposed on or beneath the surface, and is moved directionally past the pair of sensing elements by the movement of the object from which a speed measurement will be acquired. The pair of sensing elements are directionally spaced apart by a predetermined distance in the direction of the object's movement. Signals from each of the pair of sensing elements, generated by the passage of the target, are conveyed to a signal processor. The signal processor is configured to determine a phase shift between the generated signals which is inversely proportional to the speed at which the target passed the pair of sensor.

As a method for measuring a target speed, the present invention includes the steps of observing at a first point, a plurality of random features of said target, generating a first signal representative of said observations at said first point, observing at a second point displaced from said first point in a direction of motion of said target, said plurality of random features of said target, generating a second signal representative of said observations at said second point, and calculating a phase shift between said first signal and said second signal, said phase shift inversely proportional to a speed of said target.

The foregoing and other objects, features, and advantages of the invention as well as presently preferred embodiments thereof will become more apparent from the reading of the following description in connection with the accompanying drawings.

BRIEF DESCRIPTION OF DRAWINGS

In the accompanying drawings which form part of the specification.

Corresponding reference numerals indicate corresponding parts throughout the several figures of the drawings.

BEST MODE FOR CARRYING OUT THE INVENTION

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

Figure 1A:
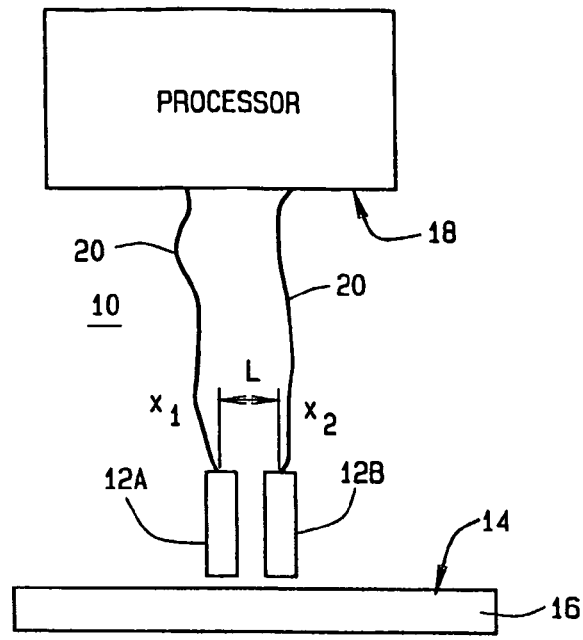
FIG. 1A is a simplified diagrammatic view of one embodiment of a speed sensor system of the present invention in relation to a linearly moving object.
Figure 1B:
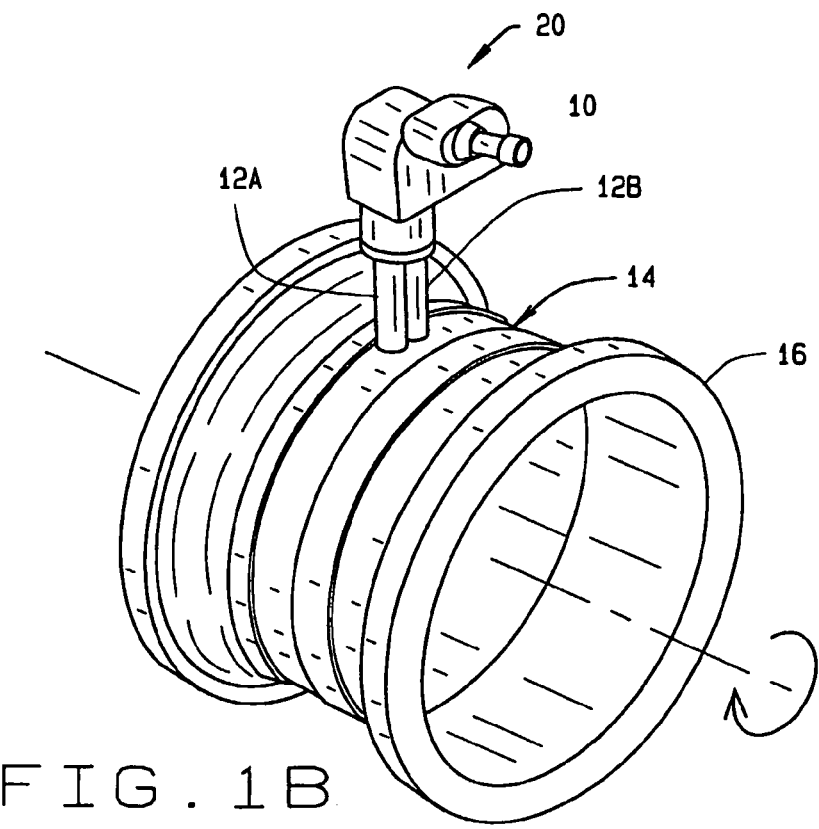
FIG. 1B is a perspective view of the speed sensor system of FIG. 1A in relation to a rotationally moving object.

Turning to FIGS. 1A and 1B, the basic components of a speed sensor system 10 of the present invention are shown. A pair of speed sensor units 12A and 12B are disposed in a spaced relationship adjacent a toothless target surface 14 of a moving object 16, for example, the circumferential surface of a bearing race as shown in FIG. 1B. Preferably, the speed sensor units 12A and 12B are spaced apart by a predetermined distance L between the speed sensor unit centers, aligned with the direction of motion of the target surface 14, shown by the arrow in FIG. 1A. The sensor units 12A and 12B are operatively coupled to a signal processing unit 18. Preferably, as shown in FIG. 1A, the sensor units 12A and 12B are directly coupled to the signal processing unit 18 by electrically conductive wires 20 configured to communicate respective signals $x_1$ and $x_2$ from the sensor units 12A and 12B to the signal processing unit 18. However, those of ordinary skill in the art will recognize that a variety of components may be utilized to couple the sensor units 12A and 12B to the signal processing unit 18, including wireless transmission components.

The operating principles of the current invention are based on generating and analyzing two mathematically correlated signals $x_1$ and $x_2$ from the pair of sensor units 12A and 12B in the speed sensor system 10. By detecting the phase shift between corresponding points in each of the two signals $x_1$ and $x_2$, a time delay can be determined. The phase variation in signals is solely related to the speed of motion. The speed of motion can be calculated as the ratio of the distance L between the sensor units 12A and 12B, and the determined time delay.

For accuracy considerations, it is highly desirable to use random signals, each preferably having a high frequency content. To this end, a target surface 14 with random or near random topographical features (roughness) is employed as target to produce randomly variable signals. With certain types of sensor units 12A and 12B, such as eddy current sensors, the randomness of the signals $x_1$ and $x_2$ can be enriched by subsurface material property variations.

The first sensing unit 12A and the second sensing unit 12B are configured to be substantially sensitive to surface and/or subsurface features of the target surface 14, and are functionally similar in that each sensor unit 12A, 12B produces identical signals or substantially similar signals when passing over the same surface or subsurface features on the target surface 14. Alternative sensor units 12 may include optical sensors sensitive to optical variations on the target surface 14.

Figure 2A:
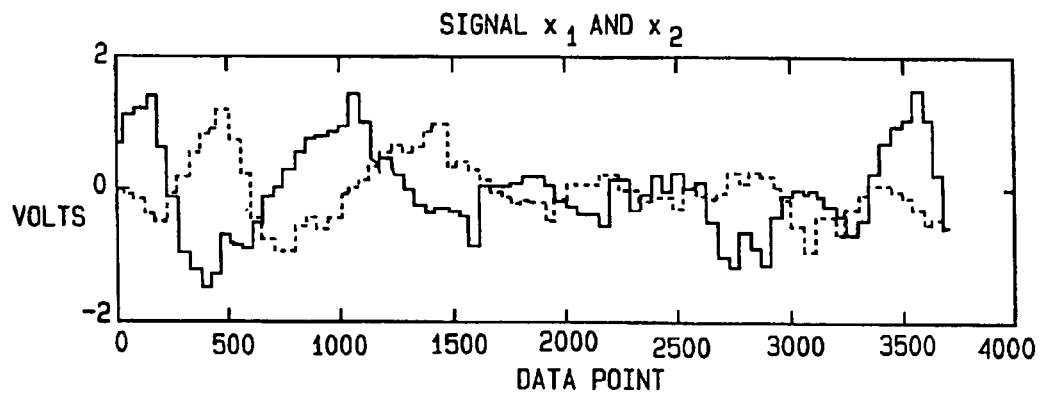
FIG. 2A graphically illustrates sample eddy-current sensor signals received from a pair of adjacent speed sensors units of the present invention.

As the target surface 14 moves relative to the speed sensor system 10, the first sensing unit 12A and the second sensing unit 12B each generate signals, such as exemplified in FIG. 2A, at an identical sampling rate f that is substantially higher than the signal variation rate, allowing the speed sensing system 10 to resolve high frequency surface features even at the highest target speeds.

In general, a correlation exists between the first signal $x_1=[x_{11}, x_{12}, x_{13}, \ldots x_{1j}, \ldots, x_{1n}]$ generated by the first sensing unit 12A and the second signal $x_2=[x_{21}, x_{22}, x_{23}, \ldots x_{2j}, \ldots, x_{2n}]$ generated by the second sensing unit 12B in response to the passage of surface or subsurface features on the target surface 14, where n represents the sample size (number of data points in a sample). There is, however, a time delay of $$\tau_0 = \frac{m}{f}$$

between the first signal $x_1$ and second signal $x_2$ where m represents the number of shifted data points. The direction of the signal shifting corresponds the direction of the motion of the target surface 14 relative to the sensor units 12A and 12B.

Thus, a cross correlation function $y(\tau)$ between the signals $x_1$ and $x_2$ may be defined by the equation:

$$y(\tau)=\int x_1(t+\tau) \cdot x_2(t) dt \qquad \text{Equation (1)}$$

which reaches a maximum value when $\tau=\tau_0$.

The time delay $\tau_0$ can be determined by finding the maximum value of the cross correlation function of the signals $x_1$ and $x_2$. That is:

$$\tau_0=\psi(y_{max}) \qquad \text{Equation (2)}$$

where $\psi$ is an inverse function to the cross correlation function $y(\tau)$ defined in Equation (1).

During operation, signal processor 18 receives and processes signals $x_1$ and $x_2$. The incoming signals $x_1$ and $x_2$ are initially processed to remove any direct current (DC) components, resulting in a pair of signals each having zero-mean such as shown in FIG. 2A. The signal processor 18 further performs the cross correlation analysis of the two signals, preferably using a Fast Fourier Transform (FFT) based algorithm for fast computation. Next, the signal processor 18 determines the time delay $\tau_0$ between the two signals by calculating the maximum value for the cross correlation function $y(\tau)$ defined in Equation (1). Finally, the speed of motion v for the target surface 14 past the sensor units 12A and 12B is computed by the signal processor 18 as:

$$v = \frac{L}{\tau_0} \qquad \text{Equation (3)}$$

Optionally, the signal processor 18 may be configured to compute a relative position of the target surface 14 by integrating the computed speed v with respect to time.

Figure 2B:
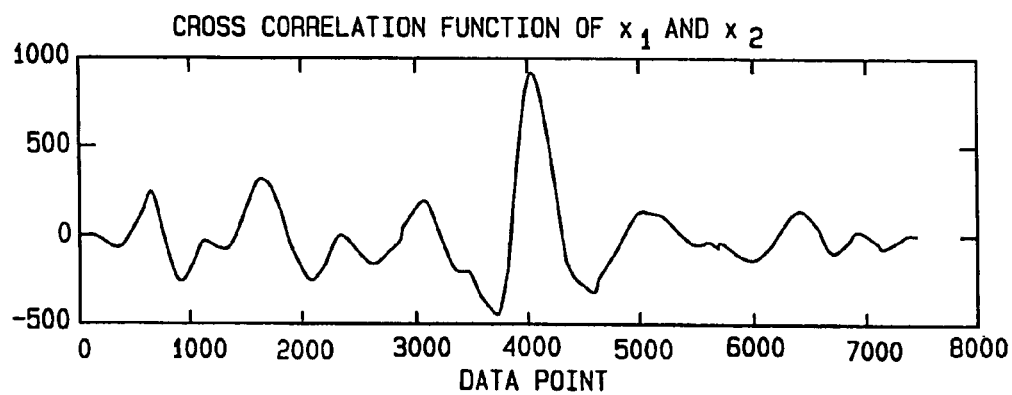
FIG. 2B graphically represents a cross correlation function between the two signals shown in FIG. 2A.

Returning to FIG. 2A, the signals $x_1$ and $x_2$ illustrated graphically are representative of signals from a pair of independent eddy current speed sensor units 12A and 12B positioned 0.788 inches apart along the circumferential direction of motion for a rotating target surface 14, such as shown in FIG. 1B. For a sampling rate of approximately 48 kHz, the resulting sample size is 3700 data points for a single revolution of the target surface 14. In the graph shown in FIG. 2A, the horizontal axis represents sample sequencing and vertical axis is the strength of the signals in volts. The cross correlation function of signals $x_1$ and $x_2$, illustrated in FIG. 2B, identifies a maximum value at data point 4036 that corresponds to a shifting of 336 data points (4036−3700=336). The corresponding time delay between the first signal $x_1$ and second signal $x_2$ is $\tau_0$=336/48000=0.007 sec. The surface speed of the target 14 is then v=0.788/0.007=112.6 in/sec. The direction of motion is determined by the direction of signal shifting.

Based on the selected sensor technology, the signal processor 18 and sensor units 12A, 12B could be integrated into a single unit 20, such as shown in FIG. 1B using modern ASIC fabrication techniques with Digital Signal Processing (DSP) computation ability.

To ensure a good correlation between the two signals $x_1$ and $x_2$ under less than ideal installation and/or application conditions, differential sensing combinations of speed sensor units 12 may optionally be used. In this case one sensor combination may contain more than two speed sensing units 12. A comparison of signals from each of the speed sensor units 12 comprising the differential sensing combinations permits removal or cancellation of signal components common to all sensing units 12, such as noise or interference, which are present at each speed sensor unit location. These common signal components usually carry no information with respect to signal phase shifting.

Figures 3A, 3B:
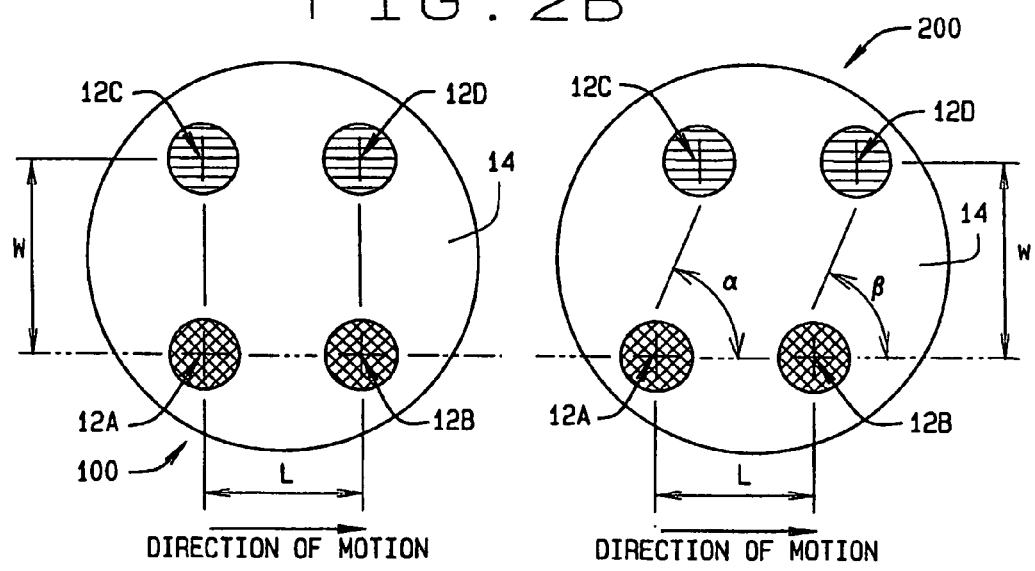
FIG. 3A illustrates a first speed sensor configuration relative to the direction of motion of a target object.
FIG. 3B illustrates a second speed sensor configuration relative to the direction of motion of a target object.
Figure 3C:
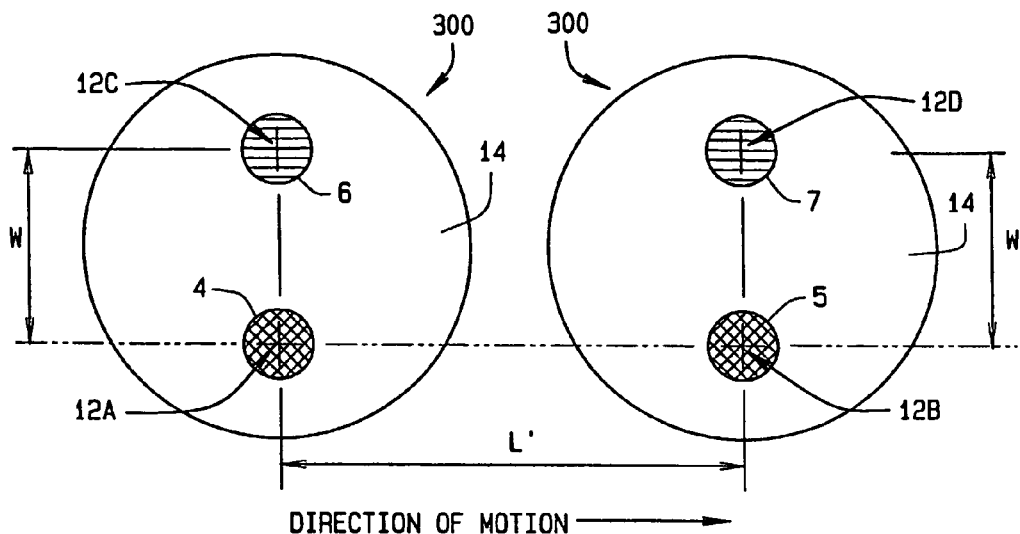
FIG. 3C illustrates a third speed sensor configuration relative to the direction of motion of a target object.

FIGS. 3A through 3C illustrate three differential sensing combinations and the positioning of the associated speed sensing units 12 in relationship to the direction of motion of the target surface 14. In FIG. 3A, a first sensor combination 100 contains four speed sensor units 12A–12D positioned at the corners of a rectangle to form two differential sensing pairs. The first differential sensing pair is formed by speed sensor units 12A and 12C, and the second differential sensing pair is formed by speed sensor units 12B and 12D. In the first differential sensing pair, speed sensor units 12A and 12C are separated by a center distance W perpendicular to the direction of motion. In the second differential sensing pair, speed sensor units 12B and 12D are similarly separated by the center distance W, perpendicular to the direction of motion. Each differential sensing pair is spaced apart by a distance L substantially in the direction of motion.

FIG. 3B illustrates an alternate arrangement for a sensing system 200 wherein the differential sensing pairs 12A, 12C and 12B, 12D are disposed at the corners of a parallelogram, i.e., where the center lines between speed sensor units 12A and 12C and between speed sensor units 12B and 12D are not perpendicular to the center line defined by the position of speed sensor units 12A and 12B. The included angle α between speed sensor units 12A, 12C and speed sensor units 12A, 12B is set equal to the included angle β between speed sensor units 12B, 12D and speed sensor units 12A, 12B. That is α=β, such that the placement of the speed sensor units 12A–12D defines a parallelogram having two sides parallel to the direction of motion of the target surface 14. In general, α and β could each vary from 0 to 360 degrees.

FIG. 3C shows an alternate arrangement for a sensing system 300 similar to that shown in FIG. 3A, but where the first pair of differential sensing units 12A, 12C and the second pair of differential sensing units 12B, 12D are disposed in two different sensor housings, and hence are spaced apart by a distance L'>L. As is shown in FIG. 3A, the centerline between the centers of sensing elements 12A and 12B substantially aligns with the direction of motion of the target surface 14. Correspondingly, the center line that connects the centers of the sensing elements 12C and 12D is also substantially aligned with the direction of motion. The center lines connecting the centers of the first pair of differential sensing units 12A, 12C is parallel with the center line that connects the centers of the second pair of differential sensing units 12B, 12D, and substantially perpendicular to the direction of motion for the target surface 14.

The current invention is not confined to any specific type of speed sensors units. However, the speed sensor units 12 are preferably eddy current sensors capable of generating signal variations induced both by topographical features on the target surface 14 and by subsurface material property changes in the target object 16. This allows the sensing system to be used not only for rough target surfaces 14 but also for smooth target surfaces 14 where the signal variation is induced primarily by subsurface material property changes rather than by surface topographical features.

Figure 4:
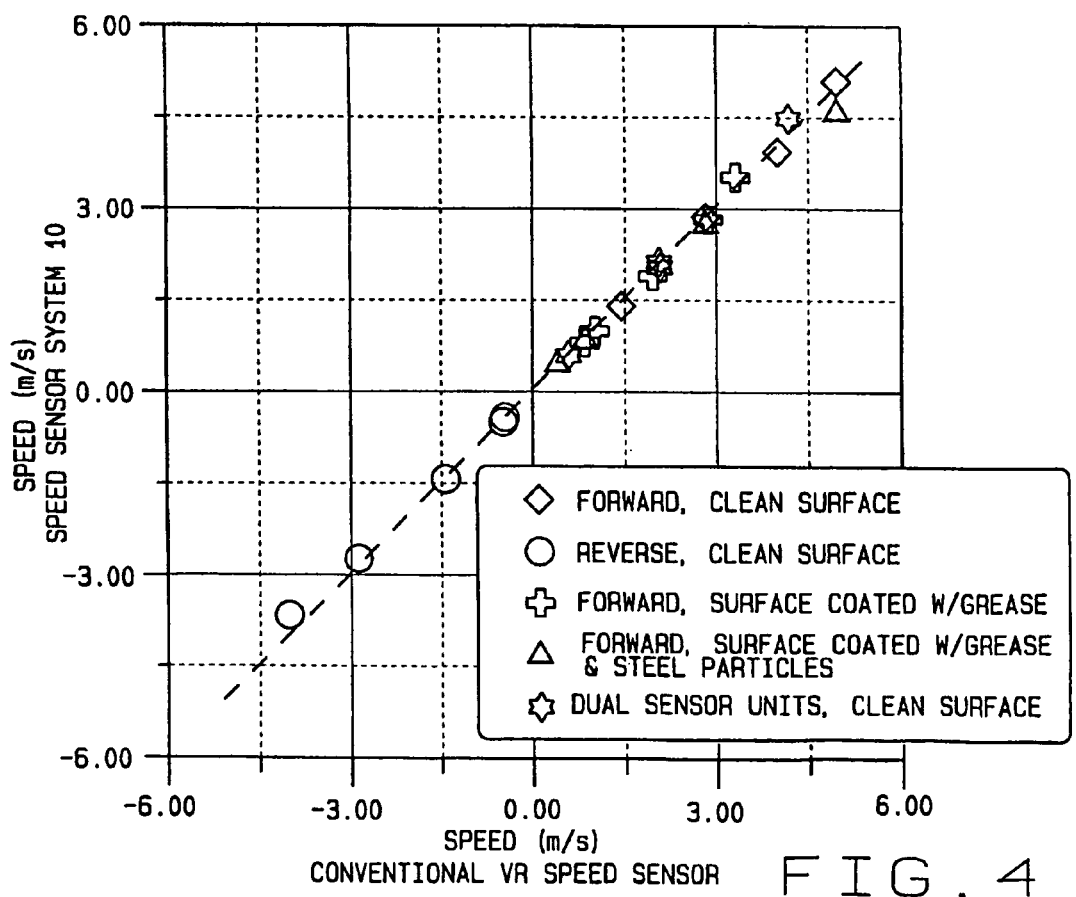
FIG. 4 compares results in measuring angular speed from a speed sensor system of the present invention using a pair of eddy current sensors together with a toothless target wheel against the results from a conventional variable reluctance (VR) speed sensor system.

FIG. 4 graphically illustrates the validity of the sensing system 10 and techniques of the present invention in measuring angular speed using a pair of eddy current speed sensor units 12A, 12B and a toothless target object 16. The graph of FIG. 4 plots the angular speed of the target object 16 as measured by the sensing system 10 of the present invention versus the angular speed of the target object 16 as measured by a conventional variable reluctance (VR) speed sensor system, illustrating a close correlation between the two sensor systems.

It should be understood that the sensing system 10 and techniques of the present invention are applicable to a host of applications such as for use in bearing application, and particularly in bearing applications wherein the target surface 14 is a bearing seal.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

The invention claimed is:

1. A speed sensing system for measuring the speed of a target object, comprising:
    a first differential speed sensor unit operatively disposed adjacent a surface of said target object, said first differential speed sensor unit configured to generate a first differential signal responsive to the passage of at least one random feature of said target object;
    a second differential speed sensor unit operatively disposed adjacent a surface of said target object and displaced at a predetermined distance from said first differential speed sensor unit substantially in a direction of motion of the target object, said second differential speed sensor unit configured to generate a second differential signal responsive to the passage of said at least one random feature of said target object;
    a signal processor configured to receive said first and second differential signals, said signal processor further configured to apply a cross correlation analysis to determine a phase shift between said first and second differential signals, said phase shift inversely proportional to a speed of said target object; and
    wherein said signal processor is configured utilize a Fast Fourier Transform-based algorithm to determine a cross correlation function between said generated differential signals, said cross correlation function defined by:

$$y(\tau) = \int x_1(t+\tau) \cdot x_2(t) dt$$

where
    $x_1$ is said first generated differential signal;
    $x_2$ is said second generated differential signal;
    t is a signal time; and
    τ is a time delay between said generated differential signals.

2. The speed sensing system of claim 1 wherein said phase shift is associated with a maximum value for said cross correlation function; and wherein said signal processor is further configured to determine a maximum value for said cross correlation function;

wherein a speed v of said target object is determined from:

$$v = \frac{L}{\tau_0}$$

where L is said predetermined distance; and
$\tau_o$ is a time delay corresponding to said determined maximum value for said cross correlation function.

3. A speed sensing system for measuring the speed of a target object, comprising:
  a first differential speed sensor unit operatively disposed adjacent a surface of said target object, said first differential speed sensor unit configured to generate a first differential signal responsive to the passage of at least one random feature of said target object;
  a second differential speed sensor unit operatively disposed adjacent a surface of said target object and displaced at a predetermined distance from said first differential speed sensor unit substantially in a direction of motion of the target object, said second differential speed sensor unit configured to generate a second differential signal responsive to the passage of said at least one random feature of said target object;
  a signal processor configured to receive said first and second differential signals, said signal processor further configured to apply a cross correlation analysis to determine a phase shift between said first and second differential signals, said phase shift inversely proportional to a speed of said target object;
  each of said first and second differential speed sensing units having an identical sampling rate; and
  wherein said identical sampling rate is substantially greater than a signal variation rate for said first and second differential speed sensing units.

4. A speed sensing system for measuring the speed of a target object, comprising:
  a first differential speed sensor unit operatively disposed adjacent a surface of said target object, said first differential speed sensor unit configured to generate a first differential signal responsive to the passage of at least one random feature of said target object;
  a second differential speed sensor unit operatively disposed adjacent a surface of said target object and displaced at a predetermined distance from said first differential speed sensor unit substantially in a direction of motion of the target object, said second differential speed sensor unit configured to generate a second differential signal responsive to the passage of said at least one random feature of said target object;
  a signal processor configured to receive said first and second differential signals, said signal processor further configured to apply a cross correlation analysis to determine a phase shift between said first and second differential signals, said phase shift inversely proportional to a speed of said target object;
  wherein said first differential speed sensor unit includes first and second speed sensors spaced at least perpendicular to a direction of motion of the target object, each of said first and second speed sensors configured to generate a signal responsive to the passage of at least one feature of said target;
  wherein said second differential speed sensor unit includes third and fourth speed sensors spaced at least perpendicular to a direction of motion of the target object, each of said third and fourth speed sensor units configured to generate a signal responsive to the passage of at least one feature of said target object;
  wherein said first and third speed sensors are disposed along a common line parallel to the direction of motion of the target object;
  wherein said second and fourth speed sensors are disposed on a second common line parallel to the motion of the target object;
  wherein said first differential signal is representative of a difference between said signals generated by said first and second speed sensors; and
  wherein said second differential signal is representative of a difference between said signals generated by said third and fourth speed sensors.

5. The speed sensing system of claim 4 wherein said signal processor is configured to cancel signal components common to said signals generated by said first, second, third, and fourth speed sensors.

6. The speed sensing system of claim 4 wherein said first and third speed sensors are configured to observe surface features of said target object; and
  wherein said second and fourth speed sensors are configured to observe subsurface features of said target object.

7. The speed sensing system of claim 4 wherein said first, second, third, and fourth speed sensors define a parallelogram having two sides parallel to the direction of motion of said target object.

8. The speed sensing system of claim 7 wherein said first, second, third, and fourth speed sensors define a rectangle having two sides perpendicular to the direction of motion of said target object.

* * * * *